US011498695B2

(12) United States Patent
Lee et al.

(10) Patent No.: US 11,498,695 B2
(45) Date of Patent: Nov. 15, 2022

(54) SYSTEM AND METHOD FOR TRANSMISSION OF ENGINE FAULT DATA

(71) Applicant: PRATT & WHITNEY CANADA CORP., Longueuil (CA)

(72) Inventors: Peter Lee, Quincy, MA (US); John P. O'Malley, North Attelboro, MA (US); James E. Mood, Mansfield, MA (US); Frederic Fortin, Sainte-Catherine (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/085,887

(22) Filed: Oct. 30, 2020

(65) Prior Publication Data

US 2022/0135244 A1    May 5, 2022

(51) Int. Cl.
*B64D 45/00*    (2006.01)
*G07C 5/08*    (2006.01)

(52) U.S. Cl.
CPC ........... *B64D 45/00* (2013.01); *G07C 5/0808* (2013.01); *B64D 2045/0085* (2013.01)

(58) Field of Classification Search
CPC ............ B64D 45/00; B64D 2045/0085; G07C 5/0808
See application file for complete search history.

(56) References Cited

U.S. PATENT DOCUMENTS

| 2010/0063754 | A1* | 3/2010 | Thomas | G01R 31/086 702/59 |
| 2013/0197725 | A1* | 8/2013 | O'Dell | B64D 45/00 701/14 |
| 2017/0233104 | A1* | 8/2017 | Bolling | B64F 5/60 701/2 |
| 2018/0093778 | A1* | 4/2018 | Spack | F02C 7/057 |
| 2018/0100784 | A1* | 4/2018 | Patil | G05B 23/0281 |
| 2018/0157255 | A1* | 6/2018 | Halverson | G08G 5/0043 |
| 2019/0080528 | A1  | 3/2019 | Bednar et al. | |
| 2021/0123443 | A1* | 4/2021 | Davidson | G07C 3/06 |

FOREIGN PATENT DOCUMENTS

| EP | 3040863 | 7/2016 |
| EP | 3413246 | 12/2018 |
| EP | 3570459 | 11/2019 |

* cited by examiner

*Primary Examiner* — Omeed Alizada
(74) *Attorney, Agent, or Firm* — Norton Rose Fulbright Canada LLP (57) ABSTRACT

A data transmission system and method for an engine of an aircraft. Engine fault data indicative of at least one fault condition of the engine is obtained at a computing device provided on-board the aircraft. Sensor data associated with the at least one fault condition is retrieved based on the engine fault data. The engine fault data and the sensor data are transmitted, through a wireless connection, to an electronic device external to the aircraft.

19 Claims, 5 Drawing Sheets

SYSTEM AND METHOD FOR TRANSMISSION OF ENGINE FAULT DATA

TECHNICAL FIELD

The application relates generally to aircraft engines and, more particularly, to transmission of engine fault data.

BACKGROUND OF THE ART

When troubleshooting malfunctions of aircraft engines, maintenance personnel generally connects a portable computing device to a data acquisition unit of the aircraft in order to retrieve engine fault codes and take appropriate corrective actions. Data access can however be reduced in remote locations where network connectivity is low. In addition, wired connections, such as through the use of cables and other electrical connectors, is often required. Moreover, in some instances, only data that is generic to the aircraft can be retrieved for troubleshooting purposes.

Therefore, there is room for improvement.

SUMMARY

In one aspect, there is provided a data transmission method for an engine of an aircraft. The method comprises, at a computing device provided on-board the aircraft, obtaining engine fault data indicative of at least one fault condition of the engine, retrieving, based on the engine fault data, sensor data associated with the at least one fault condition, and transmitting, through a wireless connection, the engine fault data and the sensor data to an electronic device external to the aircraft.

In another aspect, there is provided a system for data transmission method for an engine of an aircraft. The system comprises a processing unit provided in a computing device on-board the aircraft, and a memory communicatively coupled to the processing unit, the memory comprising a non-volatile memory, the memory comprising computer-readable program instructions executable by the processing unit for obtaining engine fault data indicative of at least one fault condition of the engine, retrieving, based on the engine fault data, sensor data associated with the at least one fault condition, and transmitting, through a wireless connection, the engine fault data and the sensor data to an electronic device external to the aircraft.

In a further aspect, there is provided a non-transitory computer readable medium having stored thereon computer-readable program instructions for data transmission method for an engine of an aircraft, the instructions executable by a processor provided on-board the aircraft for obtaining engine fault data indicative of at least one fault condition of the engine, retrieving, based on the engine fault data, sensor data associated with the at least one fault condition, and transmitting, through a wireless connection, the engine fault data and the sensor data to an electronic device external to the aircraft.

DESCRIPTION OF THE DRAWINGS

Reference is now made to the accompanying figures in which.

This paragraph is left blank; and

DETAILED DESCRIPTION

Figure 1:
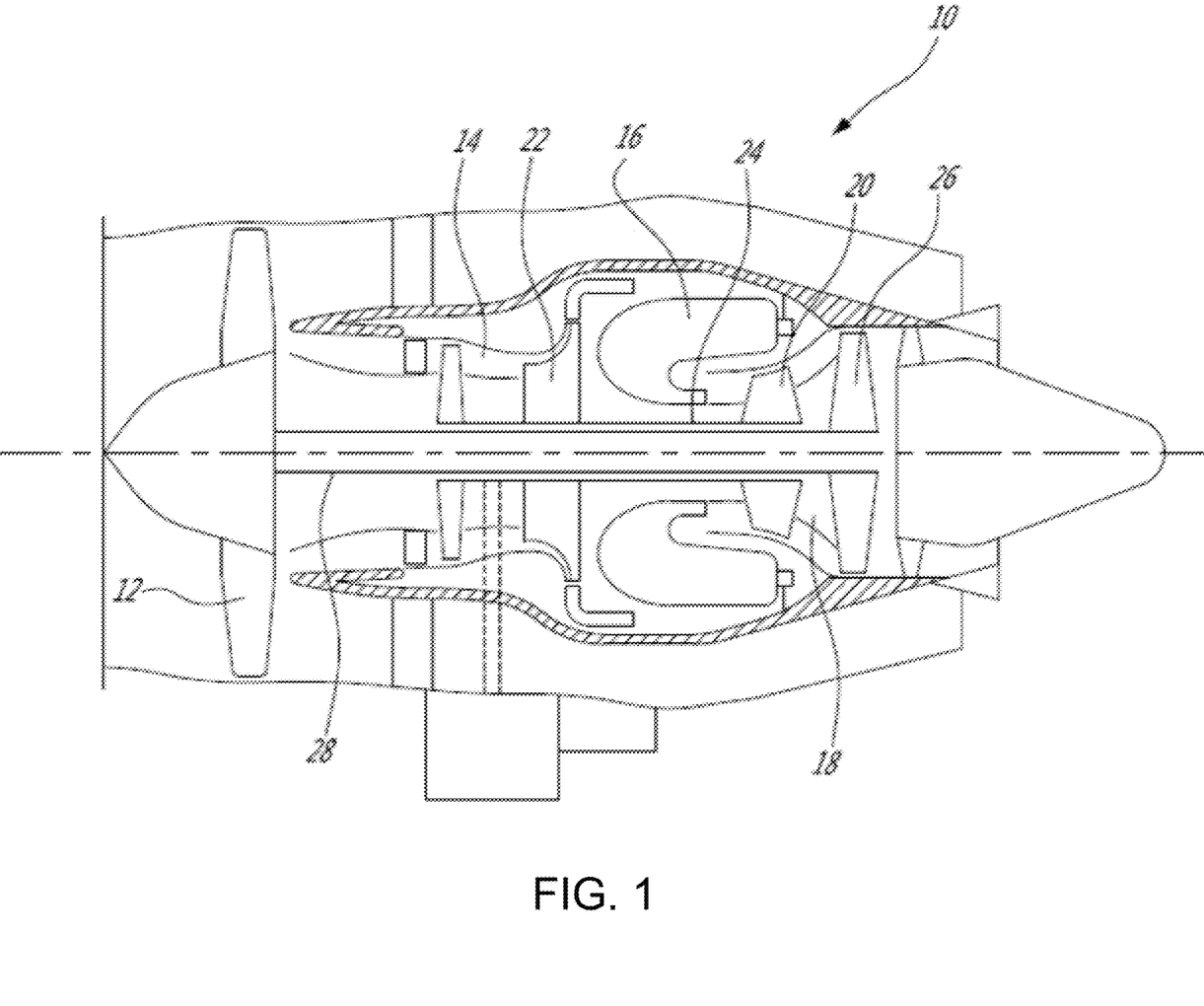
FIG. 1 is a schematic cross-sectional view of a gas turbine engine, in accordance with an illustrative embodiment.

There is described herein systems and methods for transmission of engine fault data for an aircraft. The aircraft is equipped with at least one engine. FIG. 1 illustrates an exemplary gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may be another type of engine, for example a turboshaft engine, also generally comprising in serial flow communication a compressor section, a combustor, and a turbine section, and a fan through which ambient air is propelled. Other types of aircraft engines may also apply including, but not limited to, auxiliary power units (APUs), rotary engines, electric engines, and hybrid electric propulsion systems having a propeller driven in a hybrid architecture (series, parallel, or series/parallel) or turboelectric architecture (turboelectric or partial turboelectric).

Figure 2:
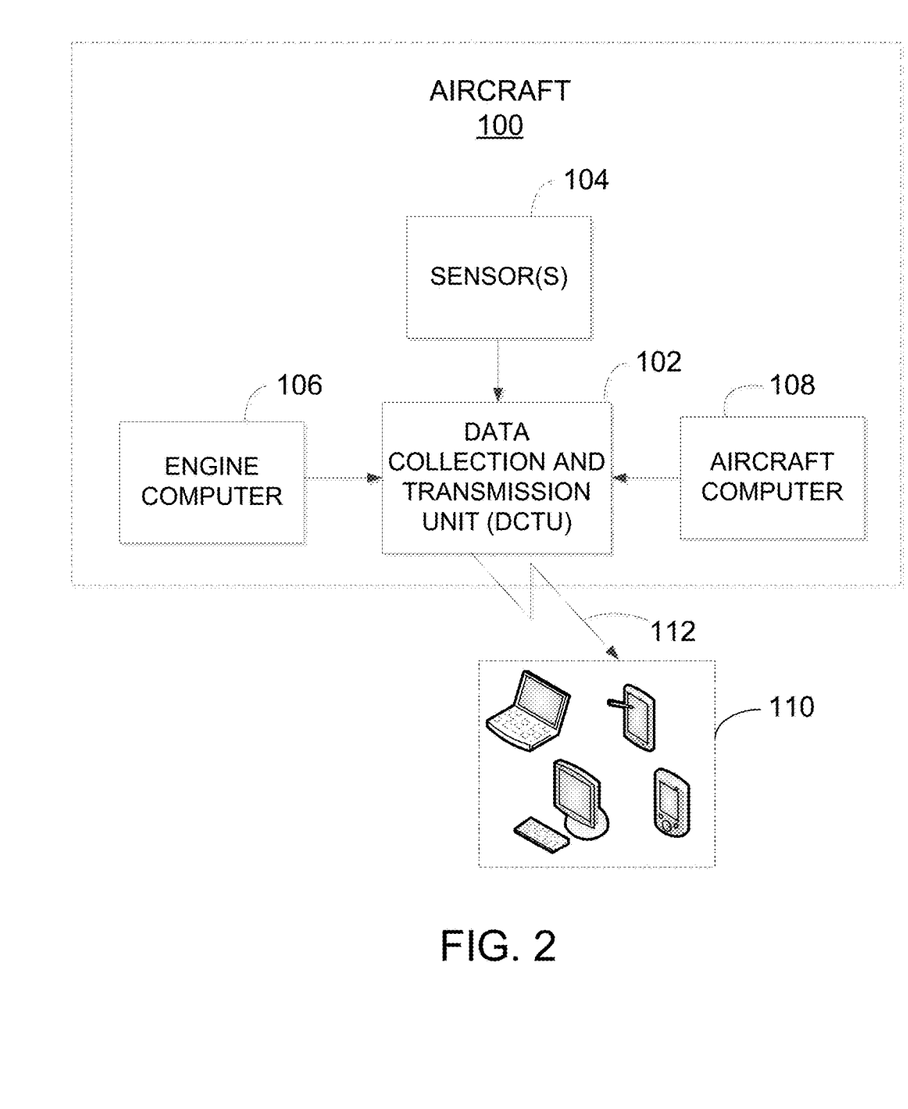
FIG. 2 is a schematic diagram of an aircraft system, in accordance with an illustrative embodiment.

FIG. 2 illustrates an example aircraft 100, in accordance with one embodiment. The aircraft 100 has an engine, such as the engine 10 of FIG. 1, and comprises a computing device 102 (referred to herein as a data collection and transmission unit, or DCTU) configured to receive data, from one or more sensors 104, an engine computer 106, and/or an aircraft computer 108, process the received data, and transmit the processed data off-aircraft to one or more electronic devices 110, which are external to the aircraft 100 and provided for maintenance (e.g., engine troubleshooting) purposes. The DCTU 102 may take various forms, such as a Flight-data Acquisition, Storage, and Transmission (FAST™) box, as manufactured by Pratt & Whitney Canada, or any other computer-controlled unit that receives data from various aircraft systems and sensors, processes the data, and transmits the data off-aircraft.

The DCTU 102 may receive data from the sensor(s) 104, engine computer 106, and/or aircraft computer 108 in real-time or at regular intervals during a flight mission of the aircraft 100, based on specific operational conditions of the engine 10 and/or the aircraft 100. In other embodiments, the DCTU 102 receives data from the sensor(s) 104, engine computer 106, and/or aircraft computer 108 at the end of the aircraft's flight mission. As used herein, the term "mission" refers to a flight to perform a specific task. The mission may be defined by various parameters, such as duration, destination, cargo, and any flying parameters to be used during the mission, such as speed or maximum altitude. For example, operator X may have aircraft A and B fly at a speed of 1050 Revolutions Per Minute (RPM) while aircraft C flies at a speed of 975 RPM. The value associated for the flight criteria "speed" may therefore differ between aircraft A and B and aircraft C. In some embodiments, operator X may define a unique set of flight criteria and associated values for each flight of an aircraft as a function of the specific flight parameters of a given flight, such as speeds, cruising altitudes, etc.

The data generated by the sensor(s) 104 and transmitted to the DCTU 102 is referred to herein as sensor data. The sensor(s) 104 may comprise a variety of data collection devices mounted in the engine 10 or other areas of the aircraft 100. In some embodiments, the sensor(s) 104 are mounted directly on the engine 10 and the installation may be permanent or temporary. A permanent mount may be performed during manufacture of the engine 10. When the aircraft 100 is assembled, the sensor(s) 104 may be connected to an existing aircraft harness (not shown). One or more additional cables, adapters, connectors, and/or harnesses may be added in order to connect the sensor(s) 104 to the existing aircraft harness. A temporary mount may be performed after manufacture of the engine 10 and/or after aircraft assembly, such as during aircraft maintenance.

The sensor(s) 104 may be configured to collect one or more measurements associated with operation of the engine 10 and/or the aircraft 100. The sensor(s) 104 are configured to acquire measurement(s) of parameter(s) of the engine 10 and/or aircraft 100 including, but not limited to, pressure (e.g., engine inlet total pressure, interstage pressure, engine pressure ratio or EPR), temperature (e.g., engine inlet total temperature, turbine inlet temperature, interstage temperature, engine exhaust gas temperature or EGT), altitude, speed (e.g., rotor speed of the engine's low-pressure rotor and high-pressure rotor, measured in RPM), acceleration, power, and torque. The sensor(s) 104 may also be configured to acquire measurement(s) of one or more parameters describing flight and ambient conditions (e.g., ambient pressure and temperature). It should be however understood that any other suitable measurements may be collected by the sensor(s) 104. Indeed, the parameters measured by the sensor(s) 104 may vary according to the type of the engine 10 and/or aircraft 100, and according to the application.

In one embodiment, the measurement(s) may be acquired by the sensor(s) 104 during a stable cruise flight condition. As understood by those skilled in the art, a stable cruise condition corresponds to an operating condition of the aircraft 100 during which certain flight criteria, which may correspond to engine parameters and/or aircraft parameters, are attained. Stable cruise condition may be operator-specific. It should however be understood that the measurement(s) may be acquired during any other suitable flight condition. For example, measurements(s) may be acquired during a constant climb phase of flight, which corresponds to a flight phase during which the aircraft 100 climbs to a given altitude at a constant climb rate.

The sensor(s) 104 are illustratively configured to collect the one or more measurements during operation of the engine 10 and/or the aircraft 100 in-flight. The one or more measurement(s) may be collected continuously and in real-time, in order to provide a complete indication of the performance of the engine 10 and/or aircraft 100 during flight. The one or more measurement(s) may, alternatively or in addition, be collected at one or more points in time during the flight mission. The one or more measurements, also referred to herein as sensor data, are then transmitted from the sensor(s) 104 to the DCTU 102.

The measurement(s) collected by the sensor(s) 104 may be transmitted to the DCTU 102 (continuously or at regular intervals), via the existing aircraft harness and/or additional cables, adapters, connectors, and/or harnesses. The Aeronautical Radio Inc. (ARINC) 429 data transfer standard for aircraft avionics may be used. Other data standards may also be used, including, but not limited to, ARINC 615, ARINC 629, ARINC 717, ARINC 664, Controller Area Network (CAN), and MIL-STD-1553. Alternatively, transmission of the data collected by the sensor(s) 104 is performed wirelessly. Therefore, the sensor(s) 104 may be configured for providing the sensor data to the DCTU 102 via any suitable wired or wireless communication path, including RS-232, USB, USB 2.0, USB 3.0, USB-C, SATA, e-SATA, Thunderbolt™, Ethernet, Wi-Fi, Zigbee™, Bluetooth™, and the like.

In some embodiments, the sensor(s) 104 may be connected to or read by the engine computer 106 and/or the aircraft computer 108 such that the measurement(s) collected by the sensor(s) 104 are received by the DCTU 102 from the engine computer 106 and/or the aircraft computer 108 (instead of directly from the sensor(s) 104).

The DCTU 102 may then use the data received from the sensor(s) 104 to record, full-flight data, trace data, and/or snapshot data for the flight mission. As used herein, the term "full-flight" data refers to all sensor values recorded from the beginning of the flight mission to the end of the flight mission. The term "trace" (or historical) data refers to sensor data that provides an indication of the manner in which the parameter(s) being measured change over time. The term "snapshot" data refers to a measurement (i.e. a data sample and not a continuously sampled data stream) that is collected at a single point in time during the flight mission. The snapshot data may also represent a time-average of measurements collected at specific points in time during the flight mission.

The data received at the DCTU 102 from the engine computer 106 and/or aircraft computer 108 may be collectively referred to as aircraft data, and denotes engine and/or aircraft performance parameters. The aircraft computer 108 may be an aircraft management controller (AMC), a flight management system (FMS), an aircraft digital computer system, or any other device used for computing inside an aircraft 100. The engine computer 106 may be any type of computing unit of the engine 10, such as an engine control unit (ECU), an engine electronic controller (EEC), an engine electronic control system, and a Full Authority Digital Engine Controller (FADEC), used to control the overall operation and performance of the engine 10. Data transmitted from the engine computer 106 and/or the aircraft computer 108 to the DCTU 102 may be provided over a dedicated communication bus or any other existing communication system of the aircraft 100. Example data provided by the aircraft computer 108 (i.e. example aircraft parameter measurements) thus comprises airspeed, altitude, stability, and position of the aircraft 100 at any point in time during a flight. Example data provided by the engine computer 106 (i.e. example engine parameter measurements) thus comprises torque, speed, rating, temperature, pressure, and compressor speed stability for the engine 10 at any point in time during engine operation.

The engine computer 106 may further be configured to detect fault(s) of the engine 10 and accordingly generate engine fault data, which may then be sent in real-time to the DCTU 102. It should however be understood that engine fault detection may alternatively be performed in the DCTU 102, based on the data received from the sensor(s) 104, engine computer 106, and/or aircraft computer 108, in the manner that will be described further below with reference to FIG. 3B.

As used herein, the term "engine fault" may refer to a physical fault that affects the thermodynamic performance of the engine 10 or to a system fault. The faults may be internal or external to the engine 10. Examples of engine faults include, but are not limited to, damaging material ingested into the engine (referred to as Foreign Object Damage or FOD), fractured blade or vane material liberated into the engine's gas path (referred to as a Domestic Object Damage or DOD), blade distortion or failure, sensor failure, bearing or gearbox failure, compressor surge (also referred to as engine or compressor stall), low pressure turbine failure, engine rollback or flameout, bleed air leak, fuel filter clogging, oil pump failure, engine bleed valve fault, turbine cooling fault, variable geometry fault, fuel control malfunction, fuel system leakage, engine start system malfunction, and indication system failure. The term "engine fault event" may refer to the occurrence of the engine fault and the term "engine fault condition" may refer to the condition in which the engine 10 exhibits the engine fault. The engine fault event is associated with the engine fault condition.

As used herein, the term "engine fault data" refers to data generated upon detection of engine faults. The engine fault data illustratively comprises a series of event codes (also referred to herein as fault codes). Each fault code is uniquely associated with (i.e. uniquely identifying) a given engine fault. In one embodiment, the fault codes are alphanumeric and comprise a series of digits. An indication of one or more sensors as in 104 whose measurements are relevant to the given fault is also associated with each fault code. The engine fault data also comprises a written or textual description of the fault code (also referred to as a fault indication message). Examples of fault code descriptions include, but are not limited to, "Engine overheat", "Engine stall", "Start fault", "Engine flameout", and "EGT over limit". The engine fault data further comprises an indication of the time at which the fault occurred as well as an indication of the location within the engine 10 where the fault occurred.

The DCTU 102 is further configured to establish a communication with the device(s) 110 in order to transmit thereto the engine fault data and any other data relevant to the engine fault. For this purpose, a wireless communication link 112 is established between the DCTU 102 and the device(s) 110. As used herein, the term "wireless" refers to the transfer of information (or data) between two points that are not connected by an electrical conductor. Any suitable wireless technology may be used to establish a wireless connection as in 112 including, but not limited to, radio waves (e.g., VHF radio, HF radio), Bluetooth™, Ultra-wideband (UWB), mobile broadband, wireless spread spectrum such as Wi-Fi (Standardized as IEEE 802.11 a, b, g, n, ac, ax), cellular data service, and satellite communication (SATCOM), and the like. As such, the devices 110 may comprise any device, such as a laptop computer, a desktop computer, a personal digital assistant, a tablet, a smartphone, a hand-held electronic device, an electronic flight bag, or the like, adapted to communicate over the communication link 112. In one embodiment, the DCTU 102 is configured to communicate with more than one device 110, although not necessarily with more than one type of device 110 at one time.

Maintenance personnel may then use the device(s) 110 to access the data associated with (or relevant to) the engine fault and accordingly perform maintenance on the engine 10 to troubleshoot malfunctions. As will be discussed further below, the data associated with the engine fault may be output at (e.g., rendered or otherwise displayed on) the device(s) 110 and maintenance personnel may access the data via a suitable input/output device, such as a video display and keyboard, associated with their device 110. In particular, the fault codes and associated indication messages contained in the engine fault data may be accessed and used to direct maintenance efforts. After carrying out appropriate corrective actions or responses to each fault code, the maintenance personnel may further update maintenance logs (or records) associated with the engine 10 and/or the aircraft 100. The maintenance record(s) may be indicative of date(s) and time(s) at which engine and/or aircraft maintenance has been performed.

Figure 3A:
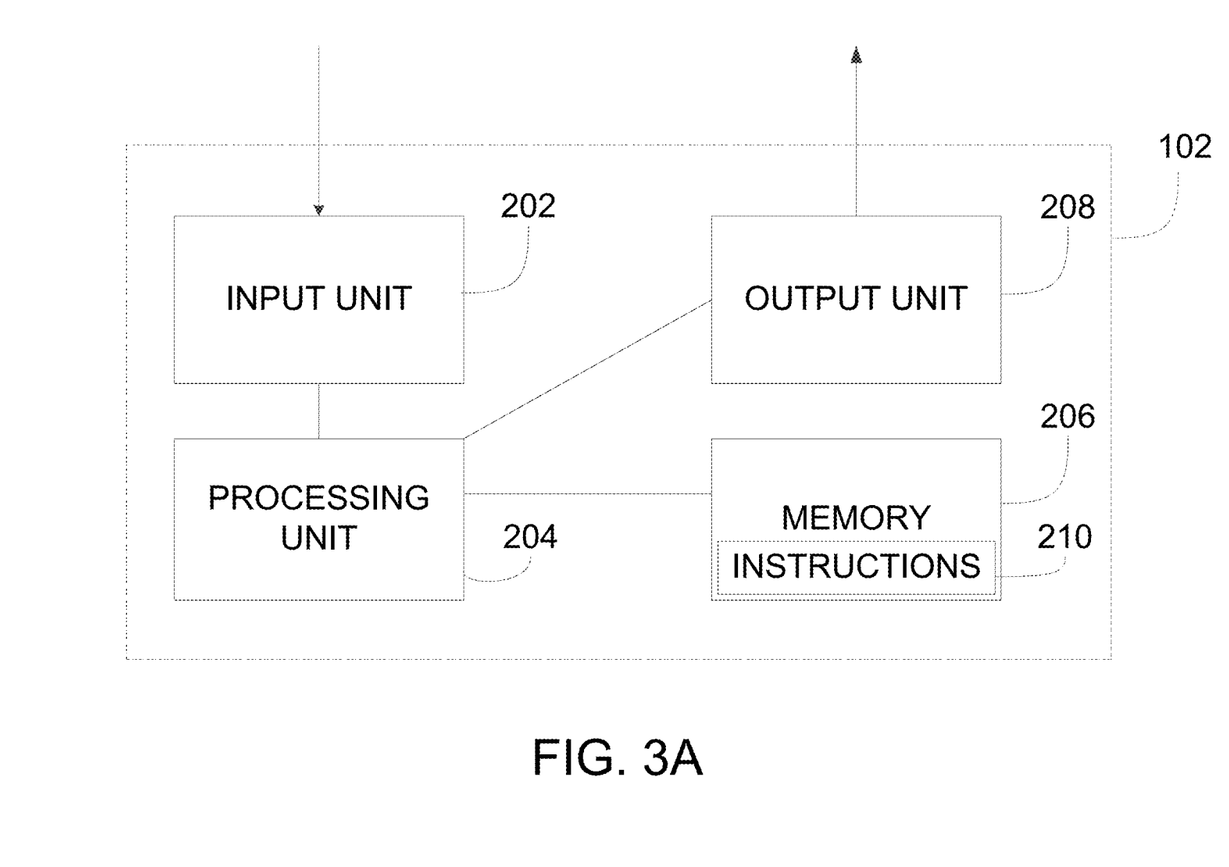
FIG. 3A is a block diagram of the data collection and transmission unit of FIG. 2, in accordance with an illustrative embodiment.
Figure 3B:
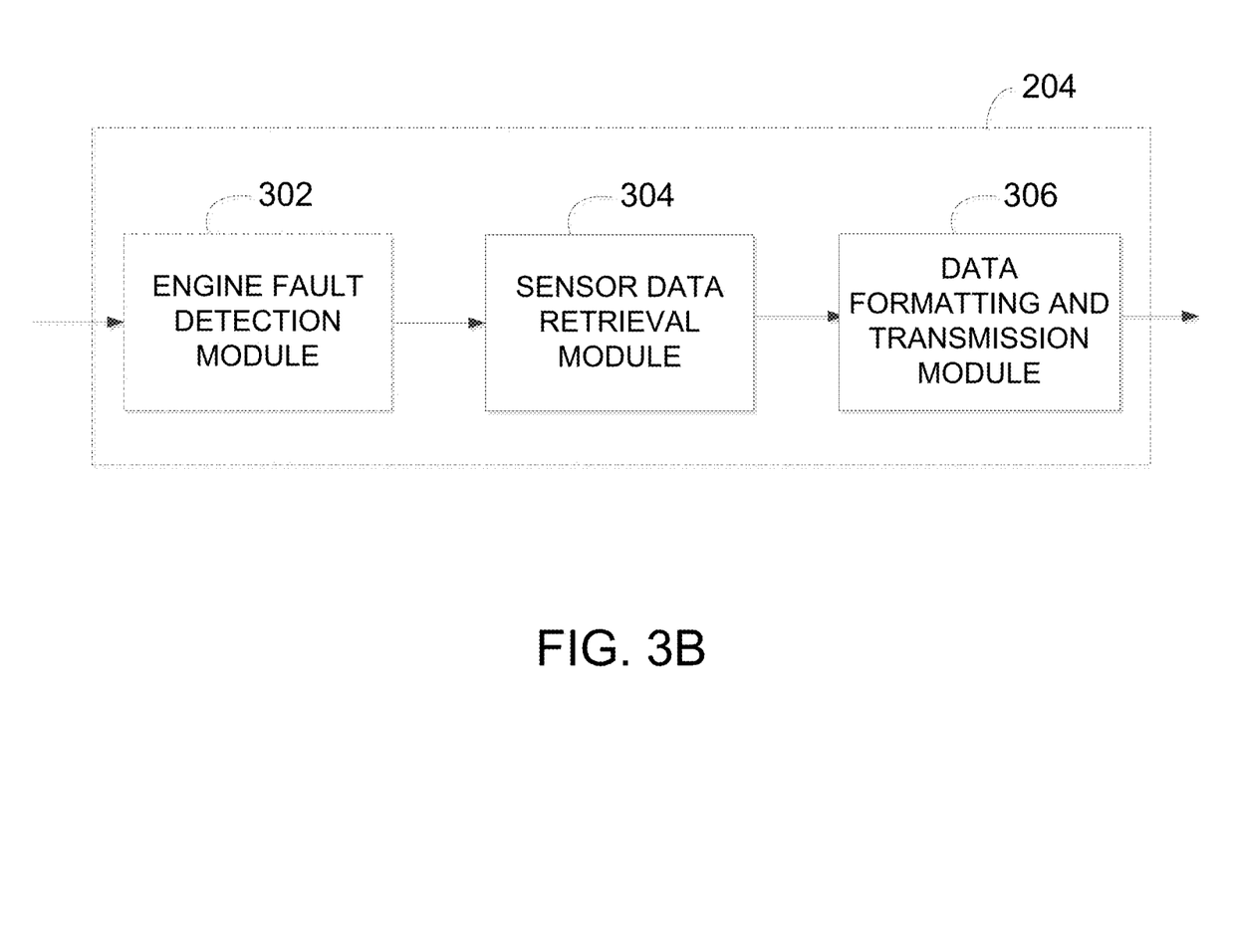
FIG. 3B is a block diagram of the processing unit of FIG. 3A, in accordance with an illustrative embodiment.

Referring now to FIG. 3A and FIG. 3B, the DCTU 108 illustratively comprises an input unit 202, at least one processing unit 204, a memory 206, and an output unit 208. Although the input unit 202, the processing unit 204, and the output unit 208 are illustrated as being separate from one another, it should be understood that units 202, 204, and 208 may be integrated together into a single unit.

The processing unit 204 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

In one embodiment, the memory 206 has stored therein computer-executable instructions 210. The memory 206 may comprise any suitable known or other machine-readable storage medium. The memory 206 may comprise non-transitory computer readable storage medium, for example, but not limited to, an electronic, magnetic, optical, electromagnetic, infrared, or semiconductor system, apparatus, or device, or any suitable combination of the foregoing. The memory 206 may include a suitable combination of any type of computer memory that is located either internally or externally to DCTU 102, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 206 may comprise any storage means (e.g., devices) suitable for retrievably storing machine-readable instructions 210 executable by processing unit 204.

The instructions 210 may be implemented in a high level procedural or object oriented programming or scripting language, or a combination thereof, to communicate with or assist in the operation of a computer system, for example the DCTU 102. Alternatively, the instructions 210 may be implemented in assembly or machine language. The language may be a compiled or interpreted language. The instructions 210 may be readable by a general or special-purpose programmable computer.

The input unit 202 illustratively comprises a data interface (not shown) configured to receive data from the sensor(s) 104, the engine computer 106, and/or the aircraft computer 108 (e.g., via one or more data buses, connectors, and the like, as described herein above). In some embodiments, the data is received at the input unit 202 using the ARINC 429 data transfer standard for aircraft avionics. Other data standards may also be used, including, but not limited to, ARINC 615, ARINC 629, ARINC 717, ARINC 664, CAN, and MIL-STD-1553. In some embodiments, the input unit 202 may be configured to digitize the data if received in analog form. As will be discussed further below, the processing unit 204 is then configured to process the data from the sensor(s) 104, the engine computer 106, and/or the aircraft computer 108, as received from the input unit 202, and to generate output data for transmission (via the output unit 208) to external device(s) (reference 110 in FIG. 2) for maintenance purposes. It should be understood that the processing unit 204 may also generate, based on the data from the sensor(s) 104, the engine computer 106, and/or the aircraft computer 108, output data for storage in the memory 206. For example, the processing unit 204 may cause the sensor data and/or the engine fault data to be stored in the memory 206 for subsequent use.

Referring now to FIG. 3B, the processing unit 204 illustratively comprises an optional engine fault detection module 302, a sensor data retrieval module 304, and a data formatting and transmission module 306.

In some embodiments, the engine fault detection module 302 may be used to perform engine fault detection within the DCTU (reference 102 in FIG. 2), based on the data received from the sensor(s) 104, engine computer 106, and/or aircraft computer 108. This may be the case when engine fault detection is not performed at the engine computer 106. For this purpose, the engine fault detection module 302 may be configured to monitor one or more engine parameters (e.g., in real-time), based on the data (e.g., the sensor measurements) received from the input unit 202. In one embodiment, the engine fault detection module 302 monitors engine parameters that are required for safe engine operation. For example, the engine fault detection module 302 may monitor spool (i.e. compressor and high-pressure turbine) speeds, fuel mass flow rate, and EGT. It should however be understood that the engine fault detection module 302 may monitor any suitable parameter based on the data received from the sensor(s) 104, engine computer 106, and/or aircraft computer 108. The engine fault detection module 302 may then compare monitored parameter value(s) to reference value(s) (e.g., threshold value(s) retrieved from the memory 206) that form a baseline for the engine 10. The engine fault detection module 302 detects a fault of the engine 10 in the event of a deviation from the baseline (i.e. upon detecting parameter value(s) beyond the threshold value(s)). For example, unusually high or low temperatures and unusually high or low pressures may be indicative of an engine fault. The engine fault detection module 302 may then generate engine fault data accordingly. In some embodiments, this may be achieved by querying a lookup table that provides an indication of fault codes and other engine fault data that is associated with particular engine fault events. Other embodiments may apply.

The engine fault data (generated by the engine fault detection module 302 or by the engine computer 106, in the manner described herein above) is provided to the sensor data retrieval module 304, which is configured to obtain sensor data that is relevant to the fault(s) identified in the engine fault data. As described herein above, each fault code has associated therewith an indication of one or more sensors 104 whose measurements are relevant to the given fault. The association between the fault codes and the relevant sensors may be provided as part of the engine fault data and may be stored in the memory 206. The sensor data retrieval module 304 may therefore query the memory 206 to retrieve the measurement(s) (i.e. the sensor data) collected by the sensor(s) associated with the fault code. Depending on the fault, the retrieved sensor data illustratively comprises at least one of snapshot data and trace data recorded (e.g., by the DCTU 102) based on the measurement(s) collected by the relevant sensor(s).

For example, the engine fault data, and more particularly the fault code, may be indicative of the presence of a compressor surge. The engine fault data may also indicate the time at which the compressor surge event occurred. Since excessive EGT is a key indicator of compressor surge, the engine fault code corresponding to compressor surge may have associated therewith EGT gauges (also referred to as turbine temperature sensing gauges) as sensors whose measurements are relevant to the compressor surge. As understood by those skilled in the art, EGT gauges are provided at the exit of the engine's turbine section (reference 18 in FIG. 1) to monitor the temperature of the turbine section 18. EGT gauges may comprise turbine inlet temperature (TIT) gauges, a turbine outlet temperature (TOT) gauges, interstage turbine temperature (ITT) gauges, and turbine gas temperature (TGT) gauges. The sensor data retrieval module 304 may therefore obtain the snapshot data (i.e. an EGT value measured at the time the compressor surge event occurred) and/or the trace data (i.e. EGT values measured over a predetermined time period encompassing the point in time at which the compressor surge event occurred) recorded from the data collected by the EGT gauges (e.g., from the sensor data received at the input unit 202).

The sensor data retrieval module 304 then outputs the engine fault data and the relevant sensor data as retrieved to the data formatting and transmission module 306, which is configured to process the received data and to generate output data for transmission to the device(s) 110. In one embodiment, the data formatting and transmission module 306 combines (using any suitable technique) the sensor data and the engine fault data into a single dataset and formats the data, which is then sent to the output unit 208 for transmission to the device(s) 110. Any suitable data format including, but not limited to, Extensible Markup Language (XML), Comma-separated values (CSV), and simple binary, may be used. In some embodiments, the data formatting and transmission module 306 may format the data such that it can be output to the device(s) 110 and easily accessed (e.g., viewed) by maintenance personnel (via a suitable input/output device, such as a video display and/or keyboard). For example, the data may be provided in a tabular format, a graph format, or any other suitable format that enables the data to be readily comprehensible by maintenance personnel once displayed on the device(s) 110. In this manner, the processing requirements of the device(s) 110 may be reduced as the latter may not need to perform additional processing of the data associated with the engine fault prior to the display thereof on the device(s) 110.

The data formatting and transmission module 306 may also generate one or more control signals for the output unit 208, the control signal(s) comprising instructions for causing transmission of the data from the DCTU 102 to the device(s) 110. The output unit 208 then transmits the data received from the data formatting and transmission module 306 to the device(s) 110 by establishing the wireless communication link (reference 112 in FIG. 2) between the DCTU 102 and the device(s) 110. For this purpose, the output unit 208 may comprise a transceiver (e.g., an IEEE 802.11 transceiver, not shown) communicatively coupled to one or more antennas (e.g., cellular and/or wireless radio antennas, not shown) to provide communication between the DCTU 102 and the device(s) 110. The transceiver and antennas may be activated, in accordance with the instructions contained in the control signal(s) received from the data formatting and transmission module 306, to cause data associated with the engine fault (i.e. engine fault data and sensor data, as processed by the data formatting and transmission module 306) to be transmitted from the DCTU 102 to the device(s) 110.

In some embodiments, the output unit 208 is configured as an 802.11 Access Point, in which an Application Data Transfer Protocol that sets the DCTU 102 as a Hypertext Transfer Protocol (HTTP) server and each device 110 as an HTTP client is used. As understood by those skilled in the art, in IEEE 802.11 wireless local area networking standards, a group of wireless network devices, also referred to as an extended service set (ESS), may be identified by the same service set identifier (or SSID) which serves as a so-called "network name". In this embodiment, the device 110 may select and initiate a wireless connection to an Access Point Name (i.e. the ESS ID) provided by the DCTU 102 and then establish a data connection with up to 256-bit encryption. The output unit 208 may indeed secure the communication link 112 between the DCTU 102 and the device(s) 110, using any suitable technique. For example, the communication link 112 may be secured through the use of passwords, using encryption based on Wi-Fi Protected Access II (WPA2) (or any other suitable encryption or security algorithm for wireless communications). Other embodiments may apply.

In addition, in some embodiments, the output unit 208 may be configured to cause the data transmitted to the device(s) 110 to be presented thereon once transmitted. For example, the output unit 208 may cause the data to be presented (e.g., plotted or otherwise displayed) on the device(s) 110 (via a suitable input/output device, such as a screen, display, or the like) in accordance with the format generated by the data formatting and transmission module 306, as discussed herein above. In one embodiment, the output unit 208 may cause the data to present the engine fault code, the description associated with the engine fault code, and the time of occurrence of the fault event. The location of the engine fault condition may also be presented. The output unit 208 may further cause presentation of the snapshot data and/or the trace data relevant to the engine fault. For example, the value of the measurement(s) collected by the sensor(s) 104 at the time at which the engine fault occurred may be presented if snapshot data is included in the engine fault data transmitted to the device(s) 110. Similarly, the values of the measurement(s) collected by the sensor(s) 104 before and after the engine fault occurred may be presented if trace data is included in the engine fault data transmitted to the device(s) 110.

In some embodiments, the data may be transmitted to the device(s) 110 automatically, upon the output unit 208 receiving the processed engine fault data and sensor data from the data formatting and transmission module 306. It should however be understood that, in other embodiments, the data may be transmitted upon the DCTU 102 receiving, through the wireless communication link 112, a corresponding request from the device(s) 110. In some embodiments, each device 110 may indeed be provided with a custom HTTP Application Programming Interface (API) that defines (through a set of commands) the manner in which the device 110 can retrieve data from the DCTU 102.

Figure 4:
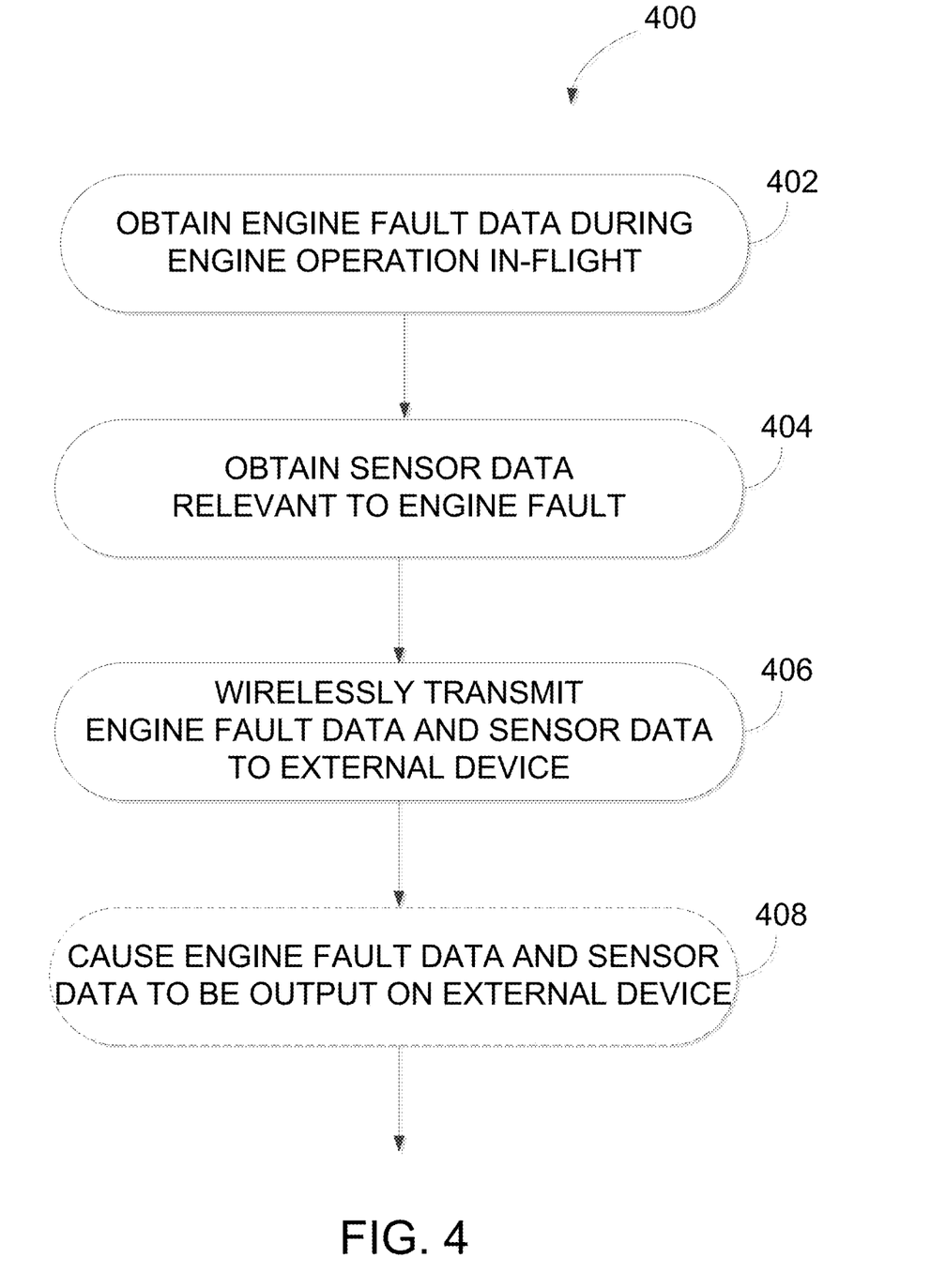
FIG. 4 is a flowchart of a method for transmission of data associated with engine fault(s), in accordance with an illustrative embodiment.

Referring now to FIG. 4, there is illustrated a flowchart for an example embodiment of a method 400 for transmission of data associated with engine fault(s), as performed by the instructions (reference 210 in FIG. 3A) when executed by the processing unit (reference 204 in FIG. 3A) of the DCTU (reference 102 in FIG. 2). The method 400 comprises, at step 402, obtaining engine fault data during operation of the engine in-flight. As discussed above, the engine fault data may be obtained from an engine computer or generated by the DCTU, based on data received from the engine computer, an aircraft computer, and/or sensor(s) provided within the aircraft. The next step 404 is to obtain sensor data relevant to the engine fault identified in the engine fault data. The relevant sensor data may be determined based on the engine fault code(s) that are received as part of the engine fault data and retrieved from memory. The sensor data obtained at step 404 comprises snapshot data and/or trace data from the measurement(s) captured by sensor(s) relevant to the engine fault. At step 406, the engine fault data and the sensor data is then transmitted wirelessly to an external electronic device, for troubleshooting and maintenance purposes. At step 408, the transmitted data may also be caused to be output (e.g., plotted, displayed, or otherwise presented) on the external device, in any suitable format.

In one embodiment, using the systems and methods described herein, data associated with an engine fault can be transmitted wirelessly off-aircraft from the DCTU (reference 102 in FIG. 2) to external device(s) (reference 110 in FIG. 2), thus alleviating the need for connecting the device(s) to the DCTU using a wired connection (e.g., cables or other electrical conductors). In this manner, access to the data associated with the engine fault may be provided in remote locations (even when Internet access is limited or unavailable), planeside, and in real-time. Using the systems and methods described herein, the data associated with the engine fault may also be transmitted to the external devices for quick and easy use by maintenance personnel. The transmitted data may indeed be output on the external device in a user-friendly manner (e.g., plotted), which enables efficient interaction with the data and in turn results in faster product return to active service state. In addition, the data provided is specific to an engine fault and includes the information (e.g. sensor data including snapshot and/or trace sensor data) necessary to debug and troubleshoot the engine fault.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A data transmission method for an engine of an aircraft, the method comprising:
at a computing device provided on-board the aircraft,
obtaining engine fault data uniquely identifying at least one fault condition of the engine;
retrieving, based on the engine fault data, sensor data associated with the at least one fault condition; and
transmitting the engine fault data and the sensor data to an electronic device external to the aircraft through a wireless connection established between the computing device and the electronic device and without accessing an intermediate network; and
causing the engine fault data and the sensor data to be presented on an output device associated with the electronic device, the electronic device used to perform maintenance on the engine based on the engine fault data and the sensor data.

2. The method of claim 1, wherein the engine fault data is obtained, during operation of the engine in-flight, from an engine computer communicatively coupled to the computing device, the engine fault data generated by the engine computer upon the engine computer detecting the at least one fault condition.

3. The method of claim 1, further comprising, at the computing device:
receiving, during operation of the engine in-flight, at least one measurement of at least one parameter of the engine;
comparing the at least one measurement to a threshold;
detecting the at least one fault condition in response to determining that the at least one measurement is beyond the threshold; and
generating the engine fault data upon detecting the at least one fault condition.

4. The method of claim 1, wherein obtaining the engine fault data comprises obtaining at least one alphanumeric fault code uniquely identifying the at least one fault condition, a description of the at least one fault code, a time of occurrence of at least one fault event associated with the at least one fault condition, and a location of the at least one fault condition in the engine.

5. The method of claim 1, wherein retrieving the sensor data comprises retrieving at least one measurement of at least one engine parameter, the at least one measurement serving as an indicator for the at least one fault condition and collected by at least one sensor at one or more points in time during operation of the engine in flight.

6. The method of claim 5, wherein retrieving the sensor data comprises retrieving the at least one measurement collected by the at least one sensor at the time of occurrence of the at least one fault event.

7. The method of claim 5, wherein retrieving the sensor data comprises retrieving the at least one measurement collected by the at least one sensor at least one of before and after the time of occurrence of the at least one fault event.

8. The method of claim 5, wherein retrieving the sensor data comprises retrieving the at least one measurement collected by the at least one sensor over a time period encompassing the time of occurrence of the at least one fault event.

9. The method of claim 1, further comprising using an encryption algorithm to establish the wireless connection with the electronic device.

10. The method of claim 1, wherein the engine fault data and the sensor data are transmitted to the electronic device upon receipt of a request from the electronic device.

11. The method of claim 1, further comprising combining the engine fault data and the sensor data into a single dataset for transmission to the electronic device.

12. A system for data transmission method for an engine of an aircraft, the system comprising:
a processing unit provided in a computing device on-board the aircraft; and
a memory communicatively coupled to the processing unit, the memory comprising a non-volatile memory,
the memory comprising computer-readable program instructions executable by the processing unit for:
obtaining engine fault data uniquely identifying at least one fault condition of the engine,
retrieving, based on the engine fault data, sensor data associated with the at least one fault condition, and
transmitting the engine fault data and the sensor data to an electronic device external to the aircraft through a wireless connection established between the computing device and the electronic device and without accessing an intermediate network, and
causing the engine fault data and the sensor data to be presented on an output device associated with the electronic device, the electronic device used to perform maintenance on the engine based on the engine fault data and the sensor data.

13. The system of claim 12, wherein the instructions are executable by the processing unit for obtaining the engine fault data comprising obtaining at least one alphanumeric fault code uniquely identifying the at least one fault condition, a description of the at least one fault code, a time of occurrence of at least one fault event associated with the at least one fault condition, and a location of the at least one fault condition in the engine.

14. The system of claim 12, wherein the instructions are executable by the processing unit for retrieving the sensor data comprising retrieving at least one measurement of at least one engine parameter, the at least one measurement serving as an indicator for the at least one fault condition and collected by at least one sensor at one or more points in time during operation of the engine in flight.

15. The system of claim 14, wherein the instructions are executable by the processing unit for retrieving the sensor data comprising retrieving the at least one measurement collected by the at least one sensor at the time of occurrence of the at least one fault event.

16. The system of claim 14, wherein the instructions are executable by the processing unit for retrieving the sensor data comprising retrieving the at least one measurement collected by the at least one sensor at least one of before and after the time of occurrence of the at least one fault event.

17. The system of claim 14, wherein the instructions are executable by the processing unit for retrieving the sensor data comprising retrieving the at least one measurement collected by the at least one sensor over a time period encompassing the time of occurrence of the at least one fault event.

18. The system of claim 12, wherein the instructions are executable by the processing unit for combining the engine fault data and the sensor data into a single dataset for transmission to the electronic device.

19. A non-transitory computer readable medium having stored thereon computer-readable program instructions for data transmission method for an engine of an aircraft, the instructions executable by a processor provided on-board the aircraft for:
- obtaining engine fault data uniquely identifying at least one fault condition of the engine;
- retrieving, based on the engine fault data, sensor data associated with the at least one fault condition;
- transmitting the engine fault data and the sensor data to an electronic device external to the aircraft through a wireless connection established between the computing device and the electronic device and without accessing an intermediate network; and
- causing the engine fault data and the sensor data to be presented on an output device associated with the electronic device, the electronic device used to perform maintenance on the engine based on the engine fault data and the sensor data.

* * * * *